(12) United States Patent
Al Ramanathan et al.

(10) Patent No.: US 10,322,533 B2
(45) Date of Patent: Jun. 18, 2019

(54) METHOD AND APPARATUS FOR THE CONTINUOUS PRODUCTION OF PIR/PUIR/PUR FOAM CORED SANDWICH PANELS

(71) Applicant: BASF SE, Ludwigshafen (DE)

(72) Inventors: Elangovan Al Ramanathan, Puchong (MY); Loh Cher Xiong, Skudai (MY)

(73) Assignee: BASF SE, Ludwigshafen (DE)

( * ) Notice: Subject to any disclaimer, the term of this patent is extended or adjusted under 35 U.S.C. 154(b) by 211 days.

(21) Appl. No.: 15/302,838

(22) PCT Filed: Apr. 2, 2015

(86) PCT No.: PCT/EP2015/057408
§ 371 (c)(1),
(2) Date: Oct. 7, 2016

(87) PCT Pub. No.: WO2015/155138
PCT Pub. Date: Oct. 15, 2015

(65) Prior Publication Data
US 2017/0028599 A1  Feb. 2, 2017

(30) Foreign Application Priority Data
Apr. 7, 2014   (EP) ..................................... 14163723

(51) Int. Cl.
*B29C 44/32*  (2006.01)
*B32B 37/12*  (2006.01)
(Continued)

(52) U.S. Cl.
CPC .......... *B29C 44/326* (2013.01); *B29C 44/461* (2013.01); *B29C 65/526* (2013.01);
(Continued)

(58) Field of Classification Search
CPC .......... B05C 1/025; B05C 1/06; B05C 1/0813
See application file for complete search history.

(56) References Cited

U.S. PATENT DOCUMENTS 3,880,559 A     4/1975   Peille
4,302,863 A *  12/1981   Droeser ................... A46B 3/14
                                                             15/183

(Continued)

FOREIGN PATENT DOCUMENTS

RU       86 906 U1    9/2009
RU       97 408 U1    9/2010
(Continued)

OTHER PUBLICATIONS

International Search Report dated Jun. 24, 2015 in PCT/EP2015/057408.

(Continued)

*Primary Examiner* — Alex A Rolland
(74) *Attorney, Agent, or Firm* — Oblon, McClelland, Maier & Neustadt, L.L.P.

(57) ABSTRACT

The present invention provides a method for the continuous production of a PIR/PUIR/PUR foam cored sandwich panel (12) with metal sheets (16, 18) as facings at top and bottom, wherein the upper metal sheet (16) and the lower metal sheet (18) are continuously fed into a double belt (28), wherein a PIR/PUIR/PUR core material is applied between the upper metal sheet (16) and the lower metal sheet (18), wherein an adhesive is applied to the lower metal sheet (18), wherein a portion of the adhesive applied to the lower metal sheet (18) is applied to the upper metal sheet (16) by means of a rotating brush. The present invention further provides an apparatus for the continuous production of a PIR/PUIR/PUR foam cored sandwich panel (12) with metal sheets (16, 18) as facings at top and bottom.

9 Claims, 3 Drawing Sheets

(51) Int. Cl.
  *B29C 44/46* (2006.01)
  *B29C 65/52* (2006.01)
  *B29C 65/70* (2006.01)
  *B29C 65/00* (2006.01)
  *B32B 37/10* (2006.01)
  *B32B 37/20* (2006.01)
  *B32B 38/00* (2006.01)
  *B29K 75/00* (2006.01)
  *B29K 79/00* (2006.01)
  *B29K 105/04* (2006.01)
  *B29L 9/00* (2006.01)

(52) U.S. Cl.
  CPC ............ *B29C 65/70* (2013.01); *B29C 66/742* (2013.01); *B29C 66/83411* (2013.01); *B32B 37/1284* (2013.01); *B29K 2075/00* (2013.01); *B29K 2079/00* (2013.01); *B29K 2105/04* (2013.01); *B29L 2009/003* (2013.01); *B29L 2009/005* (2013.01); *B32B 37/1027* (2013.01); *B32B 37/20* (2013.01); *B32B 2038/0084* (2013.01); *B32B 2305/022* (2013.01)

(56) References Cited

U.S. PATENT DOCUMENTS 5,264,167 A * 11/1993 Proksa ............... B23D 36/0091
  264/145
5,388,975 A    2/1995 Proksa et al.
2010/0276495 A1* 11/2010 Goldstein ........... B29C 44/1228
  235/488

FOREIGN PATENT DOCUMENTS

RU          2 450 109 C2   5/2012
WO     WO 2008/099052 A1   8/2008

OTHER PUBLICATIONS

International Preliminary Report on Patentability and Written Opinion of the International Searching Authority dated Oct. 12, 2016 in PCT/EP2015/057408 filed Apr. 2, 2015.

* cited by examiner

FIG.2
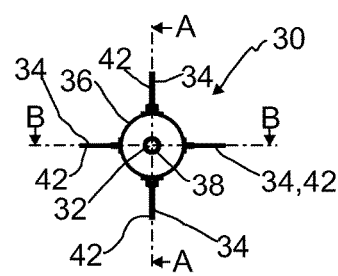
FIG.3 A-A
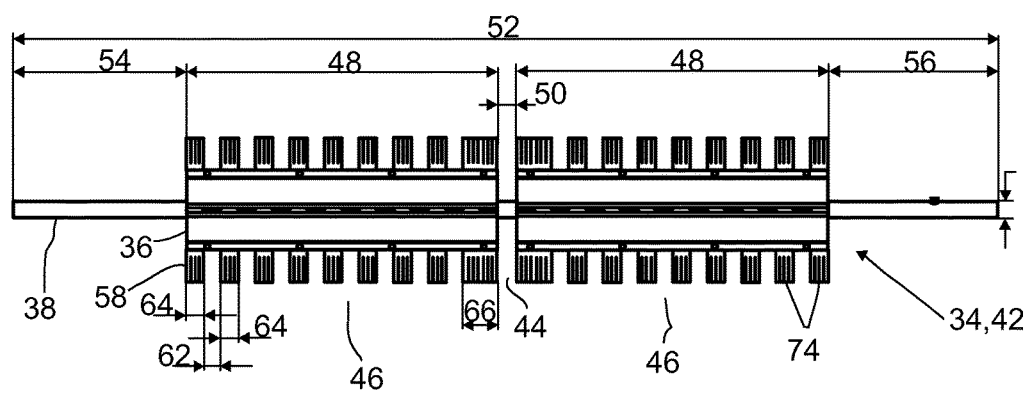
FIG.4 B-B
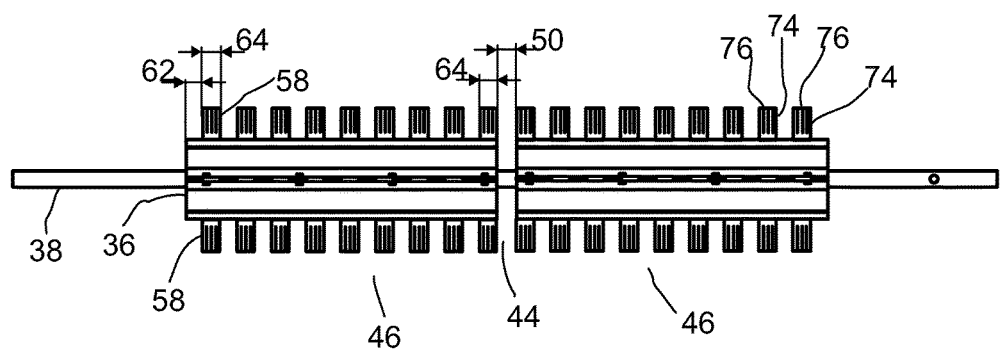

METHOD AND APPARATUS FOR THE CONTINUOUS PRODUCTION OF PIR/PUIR/PUR FOAM CORED SANDWICH PANELS

BACKGROUND

The present invention relates to a method for the production of PIR/PUIR/PUR foam cored sandwich panels with metal sheets as facings at top and bottom. The present invention further relates to an apparatus for the production of PIR/PUIR/PUR foam cored sandwich panels with metal sheets as facings at top and bottom.

Such sandwich panels are produced in continuous double belt line. With this production process, the upper metal sheet and the lower metal sheet are continuously fed into a double belt. An adhesive is applied to the lower metal sheet and, subsequently, the foam core material is dispensed between the upper metal and the lower metal sheet. With this process, the adhesion of foam to the lower metal sheet is improved and it provides a very strong foam adhesion to the lower metal sheet. However, the adhesion of the foam to the upper metal sheet is dependent on the formulation of the foam material, the metal sheet temperature, the type of coating on the metal inner surface and application of corona treatment to metal sheets. Generally, the adhesion of foam to the upper metal sheet is weaker compared to the adhesion of the foam to the lower metal sheet, where the foam-metal-bonding strength is much stronger due to the adhesive actually being applied to the lower metal sheet.

SUMMARY OF THE INVENTION

It is therefore an object of the present invention to provide a method and an apparatus for the continuous production of a PIR/PUIR/PUR foam cored sandwich panel with an improved foam adhesion to the upper metal sheet. In other words, it is an object of the present invention to provide a method and an apparatus adapted to reinforce foam adhesion to an upper metal sheet in the continuous production of a PIR/PUIR/PUR foam cored sandwich panel using a continuous double belt.

This object is solved by the subject-matters of the independent claims. Further preferred embodiments are given in the dependent claims.

In the continuous production of PIR/PUIR/PUR foam cored sandwich panel with metal sheets as facing at top and bottom, the upper metal sheet and the lower metal sheet are continuously fed into a double belt. The PIR/PUIR/PUR core material is applied between the upper metal sheet and the lower metal sheet. An adhesive is applied to the lower metal sheet. According to the present invention, a portion of the adhesive applied to the lower metal sheet is applied to the upper metal sheet by means of a rotating brush.

Accordingly, a basic idea of the present invention is that the rotating brush takes up and rolls a portion of the adhesive from the lower metal sheet onto the upper metal sheet, e.g. roughly half of the adhesive applied to the lower metal sheet may be brought into contact with the upper metal sheet. Thereby, foam adhesion to an upper metal sheet in the continuous production of a PIR/PUIR/PUR foam cored sandwich panel using a continuous double belt is reinforced The term "rotating brush" in the sense of the present invention covers both a brush, which is rotatable, and a brush, which actually is rotating. In connection with the present invention it is preferred that the rotating brush is pneumatically rotated.

The rotating brush may extend in a direction parallel to a width of the upper metal sheet and the lower metal sheet. Thereby, the adhesive may be applied to a substantial portion of the width of the upper metal sheet and the lower metal sheet. A width of the upper metal sheet and/or lower metal sheet in the sense of the present invention is a dimension thereof perpendicular to the direction in which the upper metal sheet and/or lower metal sheet are usually conveyed.

A rotational axis of the rotating brush may extend substantially parallel to the upper metal sheet and the lower metal sheet. Thereby, it is ensured that the rotating brush comes into contact with the upper metal sheet and the lower metal sheet over its complete length which improves the distribution of the adhesive. The term "substantially parallel" in the sense of the present invention covers arrangements being exactly parallel as well arrangements with a deviation from the exact parallel orientation not more than 10° and preferably not more than 5°.

For example, the rotational axis may extend in a direction parallel to a width of the upper metal sheet and the lower metal sheet. Thereby, the rotating brush may be arranged perpendicular to the direction in which the upper metal sheet and/or lower metal sheet are usually conveyed.

The adhesive may be applied to the inner surface of the lower metal sheet and a portion of the adhesive applied to the lower metal sheet is applied to the inner surface of the upper metal sheet by means of the rotating brush. Thereby, it is ensured that the surfaces of the upper metal sheet and the lower metal sheet comprise adhesive when coming into contact with the foam core material. Thus, the adhesion strength of the upper metal sheet is improved to an extent or degree comparable to the adhesion strength of the lower metal sheet to the foam core material. The term "inner surface" of the upper metal sheet and the lower metal sheet in the sense of the present invention indicates surfaces of the metal sheets facing one another and coming into contact with the foam core material.

The adhesive may be applied over a complete width of the lower metal sheet. Thereby, the rotating brush may take up the portion of the adhesive and evenly roll it onto the upper metal sheet over the complete width thereof.

For example, 40% to 60% of the adhesive applied to the lower metal sheet may be applied to the upper metal sheet by means of the rotating brush. Thereby, almost half of the adhesive applied to the lower metal sheet is applied to the upper metal sheet by means of the rotating brush. Thus, the adhesion strength of the upper metal sheet to the foam core material is substantially identical to the adhesion strength of the lower metal sheet to the foam core material.

Amount of the adhesive applied to the inner surface of lower metal sheet may be 200 g/m² to 300 g/m², preferably 220 g/m² to 280 g/m² and most preferably 230 g/m² to 270 g/m². Thereby, good adhesion strength of the upper metal sheet and the lower metal sheet to the foam core material is provided.

A rotation speed of the rotating brush may be 60 rpm to 90 rpm, preferably 65 rpm to 85 rpm and most preferably 70 rpm to 80 rpm. This rotation speed is crucial in order to ensure that the adhesion strength of the upper metal sheet to the foam core material is substantially comparable to the adhesion strength of the lower metal sheet to the foam core material.

The rotating brush may be driven by means of a pneumatic motor such as an air driven motor. In this respect, it is to be noted that the rotating brush is located in a zone of the production process which could be an explosive zone due to possible use of n-pentane or iso-pentane or cyclo-pentane or mixtures of these pentanes as foam blowing agent. Accordingly, electric motors may not be used for driving the rotating brush and the pneumatic motor is suitable for avoiding sparks and the risk of an explosion.

The rotating brush may comprise a plurality of blades. Thereby, a predetermined rigidity for the rotating brush is provided which provides a predetermined pressure on the metal sheets.

The blades may be at least partially made of polytetrafluoroethylene. Thereby, any foam material adhering on the blades may be easily peeled off and the rotating brush may be re-used.

Each of the plurality of blades may comprise a length of 30 mm to 150 mm. Thereby, the rotating brush may be adapted to the thickness of the foam cored panel which could be a minimum of 20 mm and maximum of 200 mm.

Each of the plurality of blades may comprise a plurality of bristles. Thereby, an even distribution of the adhesive to the upper metal sheet is provided.

The plurality of blades may be arranged in rows spaced apart in a circumferential direction around the rotating brush. Thereby, a sufficient amount of adhesive may be applied to the upper metal sheet.

The rows may extend parallel to a rotational axis of the rotating brush. Thereby, distribution of the adhesive to the upper metal sheet is improved.

The blades may comprise extension portions, wherein the extension portions of two adjacent rows of blades may be arranged shifted relative to one another in a direction parallel to the rotational axis of the rotating brush. Thereby, the adhesive is applied to the upper metal sheet across the width thereof.

The adhesive may be a one- or two-component adhesive. The adhesive may be an isocyanate-based or isocyanate-reaction adhesive. For example, the adhesive may comprise at least a polyol component and an isocyanate component. Such adhesives provide good adhesion strength of the metal sheets to the foam core material.

The rotating brush may be arranged downstream from an adhesive dispenser applying the adhesive. For example, the rotating brush may be arranged at a distance of 300 cm to 500 cm, preferably 350 cm to 450 cm and most preferably 370 cm to 430 cm from the adhesive dispenser. Thereby, it is ensured that sufficient amounts of the adhesive are applied to the upper metal sheet and the lower metal sheet.

The rotating brush may be arranged upstream from a core material dispenser for applying the PIR/PUIR/PUR core material. The rotating brush may be arranged at a distance of 40 cm to 80 cm, preferably 45 cm to 75 cm and most preferably 50 cm to 70 cm from the core material dispenser. Thereby, it is ensured that sufficient amount of the adhesive applied to the lower metal sheet may be applied to the upper metal sheet by means of the rotating brush before the foam core material is dispensed.

The adhesive may applied to the lower metal sheet at a temperature of 30° C. to 40° C., preferably 32° C. to 38° C. and most preferably 33° C. to 37° C. The adhesive has to remain liquid and low viscosity, i.e. the viscosity is lower than 500 cps or 0.5 Pa*s, for at least 90 seconds at 35 C, i.e. the gelling time of the adhesive is more than 100 seconds at 35° C., than with usual production processes in order to allow for the rotating brush to take up the adhesive from the lower metal sheet and to apply to the upper metal sheet. This can only be done effectively and the adhesive distributed to the upper metal sheet evenly if the adhesive remains in a liquid state for longer duration before gelling, which is ensured by these temperature ranges and the low viscosity and slow reactivity formulation of the adhesive.

An apparatus for the continuous production of PIR/PUIR/PUR foam cored sandwich panel with metal sheets as facings at top and bottom according to the present invention comprises an upper roller for providing an upper metal sheet, a lower roller for providing a lower metal sheet, an adhesive dispenser for applying an adhesive to the lower metal sheet, a core material dispenser for applying a PIR/PUIR/PUR core material between the upper metal sheet and the lower metal sheet, and a rotating brush, wherein the rotating brush is adapted to apply to the upper metal sheet a portion of the adhesive applied to the lower metal sheet.

The rotating brush may extend in a direction parallel to a width of the upper metal sheet and the lower metal sheet. A rotational axis of the rotating brush may extend substantially parallel to the upper metal sheet and the lower metal sheet. The rotational axis may extend in a direction parallel to a width of the upper metal sheet and the lower metal sheet. The adhesive dispenser may be adapted to apply the adhesive to an inner surface of the lower metal sheet and the rotating brush is adapted to apply a portion of the adhesive applied to the lower metal sheet to an inner surface of the upper metal sheet. The adhesive dispenser may be adapted to apply the adhesive over a complete width of the lower metal sheet. The apparatus may further comprise a pneumatic motor for driving the rotating brush. The rotating brush may comprise a plurality of blades. The blades may be at least partially made of polytetrafluoroethylene. Each of the plurality of blades may comprise a length of 30 mm to 150 mm. Each of the plurality of blades may comprise a plurality of bristles. The plurality of blades may be arranged in rows spaced apart in a circumferential direction around the rotating brush. The rows may extend parallel to a rotational axis of the rotating brush. The blades may comprise extension portions. The extension portions of two adjacent rows may be arranged shifted relative to one another in a direction parallel to a rotational axis of the rotating brush. The rotating brush may be arranged downstream from the adhesive dispenser. The rotating brush may be arranged at a distance of 300 cm to 500 cm, preferably 350 cm to 450 cm and most preferably 370 cm to 430 cm from the adhesive dispenser. The rotating brush may be arranged upstream from the core material dispenser. The rotating brush may be arranged at a distance of 40 cm to 80 cm, preferably 45 cm to 75 cm and most preferably 50 cm to 70 cm from the core material dispenser. The adhesive may be a one- or two-component adhesive. The adhesive may be an isocyanate-based or isocyanate-polyol reaction adhesive. The adhesive may comprises at least a polyol component and an isocyanate component.

Summarizing the above, particular embodiments of the present invention are:
1. A method for the continuous production of a PIR/PUIR/PUR foam cored sandwich panel with metal sheets as facings at top and bottom, wherein an upper metal sheet and a lower metal sheet are continuously fed into a double belt, wherein a PIR/PUIR/PUR core material is applied between the upper metal sheet and the lower metal sheet, wherein an adhesive is applied to the lower metal sheet, wherein a portion of the adhesive applied to the lower metal sheet is applied to the upper metal sheet by means of a rotating brush.
2. The method according to the preceding embodiment, wherein the rotating brush extends in a direction parallel to a width of the upper metal sheet and the lower metal sheet.

3. The method according to any preceding embodiment, wherein a rotational axis of the rotating brush extends substantially parallel to the upper metal sheet and the lower metal sheet.
4. The method according to the preceding embodiment, wherein the rotational axis extends in a direction parallel to a width of the upper metal sheet and the lower metal sheet.
5. The method according to any preceding embodiment, wherein the adhesive is applied to an inner surface of the lower metal sheet and a portion of the adhesive applied to the lower metal sheet is applied to an inner surface of the upper metal sheet by means of the rotating brush.
6. The method according to any preceding embodiment, wherein the adhesive is applied over a complete width of the lower metal sheet.
7. The method according to any preceding embodiment, wherein 40% to 60% of the adhesive applied to the lower metal sheet is applied to the upper metal sheet by means of the rotating brush.
8. The method according to any preceding embodiment, wherein an amount of the adhesive applied to the inner surface of lower metal sheet is 200 $g/m^2$ to 300 $g/m^2$, preferably 220 $g/m^2$ to 280 $g/m^2$ and most preferably 230 $g/m^2$ to 270 $g/m^2$.
9. The method according to any preceding embodiment, wherein a rotation speed of the rotating brush is 60 rpm to 90 rpm, preferably 65 rpm to 85 rpm and most preferably 70 rpm to 80 rpm.
10. The method according to any preceding embodiment, wherein the rotating brush is driven by means of a pneumatic motor.
11. The method according to any preceding embodiment, wherein the rotating brush comprises a plurality of blades, wherein the blades are at least partially made of polytetrafluoroethylene.
12. The method according to the preceding embodiment, wherein each of the plurality of blades comprises a length of 30 mm to 150 mm.
13. The method according to any one of the two preceding embodiments, wherein each of the plurality of blades comprises a plurality of bristles.
14. The method according to any one of the three preceding embodiments, wherein the plurality of blades are arranged in rows spaced apart in a circumferential direction around the rotating brush.
15. The method according to the preceding embodiment, wherein the rows extend parallel to a rotational axis of the rotating brush.
16. The method according to the preceding embodiment, wherein the blades comprise extension portions, wherein the extension portions of two adjacent rows are arranged shifted relative to one another in a direction parallel to a rotational axis of the rotating brush.
17. The method according to any preceding embodiment, wherein the adhesive is a one- or two-component adhesive.
18. The method according to any preceding embodiment, wherein the adhesive is an isocyanate-based or isocyanate-polyol reaction adhesive.
19. The method according to any preceding embodiment, wherein the adhesive comprises at least a polyol component and an isocyanate component.
20. The method according to any preceding embodiment, wherein the rotating brush is arranged downstream from an adhesive dispenser for applying the adhesive.
21. The method according to the preceding embodiment, wherein the rotating brush is arranged at a distance of 300 cm to 500 cm, preferably 350 cm to 450 cm and most preferably 370 cm to 430 cm from the adhesive dispenser.
22. The method according to any preceding embodiment, wherein the rotating brush is arranged upstream from a core material dispenser for applying the PIR/PUIR/PUR core material.
23. The method according to the preceding embodiment, wherein the rotating brush is arranged at a distance of 40 cm to 80 cm, preferably 45 cm to 75 cm and most preferably 50 cm to 70 cm from the core material dispenser.
24. The method according to any preceding embodiment, wherein the adhesive is applied to the lower metal sheet at a temperature of 30° C. to 40° C., preferably 32° C. to 38° C. and most preferably 33° C. to 37° C.
25. An apparatus for the continuous production of a PIR/PUIR/PUR foam cored sandwich panel with metal sheets as facings at top and bottom, comprising
an upper roller for providing an upper metal sheet,
a lower roller for providing a lower metal sheet,
an adhesive dispenser for applying an adhesive to the lower metal sheet,
a core material dispenser for applying a PIR/PUIR/PUR core material between the upper metal sheet and the lower metal sheet, and
a rotating brush, wherein the rotating brush is adapted to apply a portion of the adhesive applied to the lower metal sheet to the upper metal sheet.
26. The apparatus according to the preceding embodiment, wherein the rotating brush extends in a direction parallel to a width of the upper metal sheet and the lower metal sheet.
27. The apparatus according to any one of embodiments 25 to 26, wherein a rotational axis of the rotating brush extends substantially parallel to the upper metal sheet and the lower metal sheet.
28. The apparatus according to the preceding embodiment, wherein the rotational axis extends in a direction parallel to a width of the upper metal sheet and the lower metal sheet.
29. The apparatus according to any one of embodiments 25 to 28, wherein the adhesive dispenser is adapted to apply the adhesive to an inner surface of the lower metal sheet and the rotating brush is adapted to apply a portion of the adhesive applied to the lower metal sheet to an inner surface of the upper metal sheet.
30. The apparatus according to any one of embodiments 25 to 29, wherein the adhesive dispenser is adapted to apply the adhesive over a complete width of the lower metal sheet.
31. The apparatus according to any one of embodiments 25 to 30, further comprising a pneumatic motor for driving the rotating brush.
32. The apparatus according to any one of embodiments 25 to 31, wherein the rotating brush comprises a plurality of blades, wherein the blades are at least partially made of polytetrafluoroethylene.
33. The apparatus according to the preceding embodiment, wherein each of the plurality of blades comprises a length of 30 mm to 150 mm.
34. The apparatus according to any one of the two preceding embodiments, wherein each of the plurality of blades comprises a plurality of bristles.
35. The apparatus according to any one of the three preceding embodiments, wherein the plurality of blades are arranged in rows spaced apart in a circumferential direction around the rotating brush.

36. The apparatus according to the preceding embodiment, wherein the rows extend parallel to a rotational axis of the rotating brush.
37. The apparatus according to the preceding embodiment, wherein the blades comprise extension portions, wherein the extension portions of two adjacent rows are arranged shifted relative to one another in a direction parallel to a rotational axis of the rotating brush.
38. The apparatus according to any one of embodiments 25 to 37, wherein the rotating brush is arranged downstream from the adhesive dispenser.
39. The apparatus according to the preceding embodiment, wherein the rotating brush is arranged at a distance of 300 cm to 500 cm, preferably 350 cm to 450 cm and most preferably 370 cm to 430 cm from the adhesive dispenser.
40. The apparatus according to any one of embodiments 25 to 39, wherein the rotating brush is arranged upstream from the core material dispenser.
41. The apparatus according to the preceding embodiment, wherein the rotating brush is arranged at a distance of 40 cm to 80 cm, preferably 45 cm to 75 cm and most preferably 50 cm to 70 cm from the core material dispenser.
42. The apparatus according to any one of embodiments 25 to 41, wherein the adhesive is a one- or two-component adhesive.
43. The apparatus according to any one of embodiments 25 to 42, wherein the adhesive is an isocyanate-based or isocyanate-polyol reaction adhesive.
44. The apparatus according to the preceding embodiment, wherein the adhesive comprises at least a polyol component and an isocyanate component.

BRIEF DESCRIPTION OF THE DRAWINGS

By way of example, a method and an apparatus for the continuous production of a PIR/PUIR/PUR foam cored sandwich panel in accordance with the present invention will now be described with reference to the accompanying drawings in which:

FIG. 2 shows a side view of a rotating brush;

FIG. 3 shows a first cross-sectional view of the rotating brush;

FIG. 4 shows a second cross-sectional view of the rotating brush;

DETAILED DESCRIPTION

Figure 1:
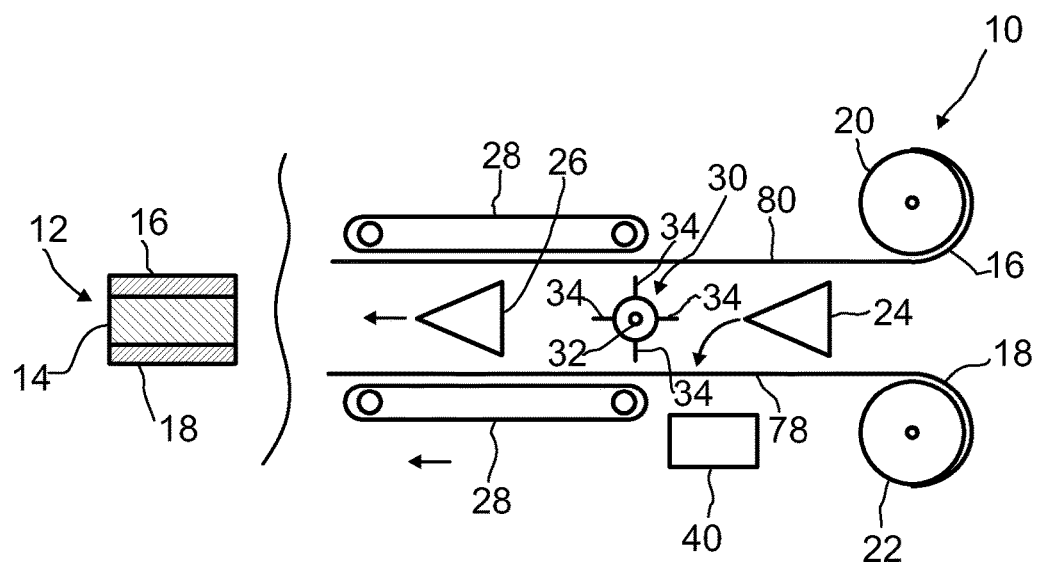
FIG. 1 shows a side view of an apparatus for producing PIR/PUIR/PUR foam cored sandwich panels.

FIG. 1 shows a side view of an apparatus 10 for the continuous production of a PIR/PUIR/PUR foam cored sandwich panel 12. Such a sandwich panel 12 comprises a foam core 14, which is made of polyisocyanurate (PIR), polyurethane-modified-polyisocyanurate (PUIR) or polyurethane (PUR), an upper metal sheet 16 and a lower metal sheet 18 as facings which sandwich the foam core 14.

The apparatus 10 comprises an upper roller 20 on which the upper metal sheet 16 is provided or rolled up and a lower roller 22 on which the lower metal sheet 18 is provided or rolled up. The apparatus 10 further comprises an adhesive dispenser 24 for applying an adhesive, a core material dispenser 26 for applying a PIR/PUIR/PUR core material as foam core material and a double belt 28 for conveying the upper metal sheet 16 and the lower metal sheet 18. Between the adhesive dispenser 24 and the core material dispenser 26, a rotating brush 30 is arranged. With respect to a conveying direction of the upper metal sheet 16 and the lower metal sheet 18, the rotating brush 30 is arranged downstream from the adhesive dispenser 24. Particularly, the rotating brush 30 is arranged at a distance of 300 cm to 500 cm, preferably 350 cm to 450 cm and most preferably 370 cm to 430 cm from the adhesive dispenser 24, for example 400 cm. Further, with respect to a conveying direction of the upper metal sheet 16 and the lower metal sheet 18, the rotating brush 30 is arranged upstream from the core material dispenser 26. Particularly, the rotating brush 30 is arranged at a distance of 40 cm to 80 cm, preferably 45 cm to 75 cm and most preferably 50 cm to 70 cm from the core material dispenser 26, for example 60 cm.

The rotating brush 30 extends in a direction parallel to a width of the upper metal sheet 16 and the lower metal sheet 18. Thus, a rotational axis 32 of the rotating brush 30 extends substantially parallel to the upper metal sheet 16 and the lower metal sheet 18. More particularly, the rotational axis 32 extends in a direction parallel to the width of the upper metal sheet 16 and the lower metal sheet 18. Preferably, the rotational axis 32 extends in a horizontal direction, i.e. a direction perpendicular with respect to the direction of gravity.

FIG. 2 shows a side view of the rotating brush 30. The rotating brush 30 comprises a plurality of blades 34. The blades 34 are arranged on a cylindrical body 36 of the rotating brush 30. The body 36 comprises a diameter of 110 mm. Further, a drive shaft 38, which defines the rotational axis 32, extends through the body 36. The drive shaft 38 comprises a diameter of 28 mm. The drive shaft 38 is connected to a pneumatic motor 40 for rotating the rotating brush 30 (FIG. 1). The pneumatic motor 40 may be an air driven motor. The blades 34 are at least partially made of polytetrafluoroethylene. The blades 34 are arranged in rows 42 evenly spaced apart in a circumferential direction around the rotating brush 30. In the embodiment shown, four rows 42 are present. The rows 42 extend parallel to the rotational axis 32 of the rotating brush 30.

FIG. 3 shows a first cross-sectional view of the rotating brush 30 taken along line A-A in FIG. 2 and running through first and third ones of the rows 42. The first and third ones of the rows 42 are split by a gap 44 into two symmetrically arranged groups 46 of blades 34, each having a width 48 of 540 mm. The gap 44 has a width 50 of 35 mm. The overall construction of the rotating brush 30 including the drive shaft 38 has a width 52 of 1710 mm. Thus, the drive shaft 38 protrudes from the body 36 on either side of the body 36 with lengths 54, 56 of 300 mm and 295 mm, respectively.

FIG. 4 shows a second cross-sectional view of the rotating brush 30 taken along line B-B in FIG. 2 and running through second and fourth ones of the rows 42. The construction of the blades 34 of the second and fourth ones of the rows 42 is almost identical to the first and third ones of the rows 42. However, it is to be noted that the blades 34 of two adjacent rows 42 are arranged relative to one another in a direction parallel to the rotational axis 32 of the rotating brush 30 as will be explained in more detail below.

Figure 5:
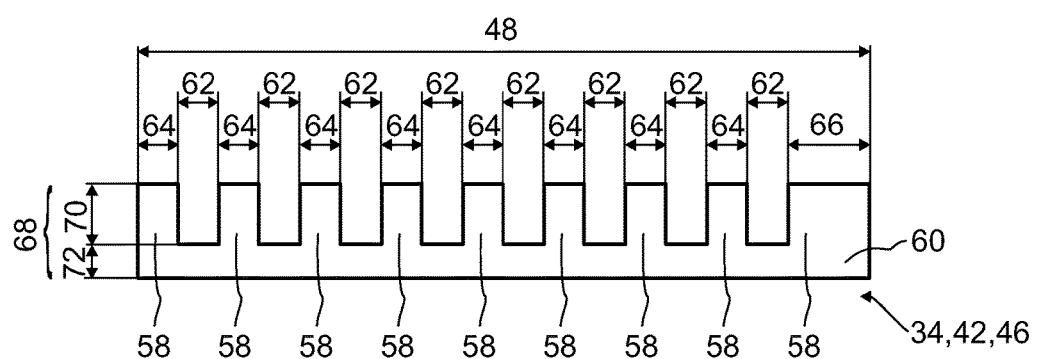
FIG. 5 shows a perspective view of a first row of blades.

FIG. 5 shows a perspective view of a first row 42 of the blades 34. More particularly, FIG. 5 shows a perspective view of a first group 46 of a first row 42 of the blades 34. The blade 34 comprises a plurality of extension portions 58 and a foot portion 60. The foot portion 60 is adapted to be fixed to the body 36 of the rotating brush 30. The extension portions 58 protrude from the foot portion 60 in a radial direction with respect to the rotational axis 32 of the rotating brush 30. The extension portions 58 are spaced from one another in a direction of the rotational axis 32 with a distance 62 of 30 mm. Each of the extension portions 58 comprises a width 64 of 30 mm except for the extension portions 58 adjacent the gap 44 which comprise a width 66 of 60 mm. Each of the plurality of blades 34 comprises a length 68 of 30 mm to 150 mm. The length 68 is defined by a length 70 of the extension portions 58 and a length 72 of the foot portion 60. The length 68 depends on the thickness of the metal sheets 16, 18. For example, the plurality of blades 34 may comprise a length 68 of 105 mm for metal sheets 16, 18 having a thickness of 4-8 inches and may comprise a length 68 of 70 mm for metal sheets 16, 18 having a thickness of 2-4 inches. Further, each of the blades 34 comprises a plurality of bristles 74. The bristles 74 are arranged at a leading end 76 of the extension portions 58 (FIGS. 3 and 4). Even though not shown in detail, at least in use the bristles 74 protrude from the extension portions 58 in a radial direction with respect to the rotational axis 32 of the rotating brush 30.

Figure 6:
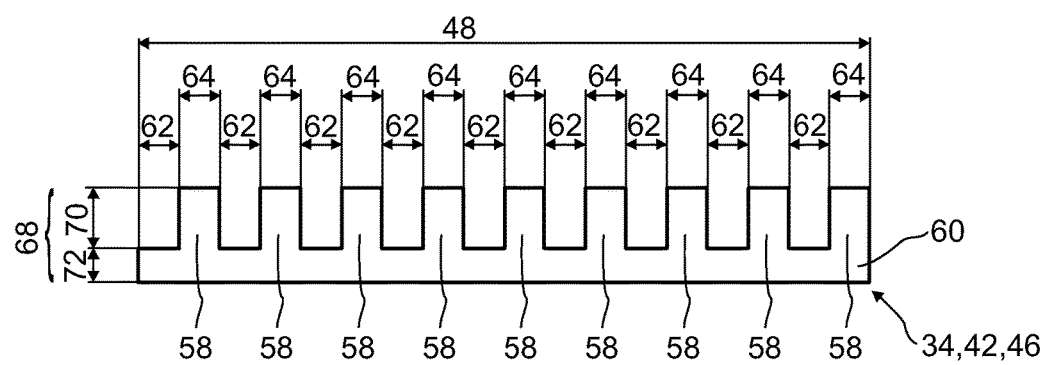
FIG. 6 shows a perspective view of a second row of blades.

FIG. 6 shows a perspective view of a second row 42 of the blades 34 adjacent to the first row 42. More particularly, FIG. 6 shows a perspective view of a second group 46 of a first row 42 of the blades 34. The construction of the blades 34 of the second row 42 is almost identical to the first row 42. However, as mentioned above, it is to be noted that the blades 34 of two adjacent rows 42 are arranged relative to one another in a direction parallel to the rotational axis 32 of the rotating brush 30. With other words and with reference to FIGS. 5 and 6, the extension portions 58 of the first row 42 are shifted relative to the extension portions 58 of the second row 42 in a direction parallel to the rotational axis 32 of the rotating brush 30. More particularly, with reference to FIGS. 5 and 6, the extension portions 58 of the row 42 shown in FIG. 5 are shifted to the right relative to the extension portions 58 of the row 42 shown in FIG. 6.

Now, a method for the continuous production of a PIR/PUIR/PUR foam cored sandwich panel 12 will be explained. The method may be carried out by use of the apparatus 10.

Generally, the upper metal sheet 16 is unrolled from the upper roller 20 and the lower metal sheet 18 is unrolled from the lower roller 22. The upper metal sheet 16 and the lower metal sheet 18 are conveyed towards the double belt 28. It is to be noted that the upper metal sheet 16 and the lower metal sheet 18 are fed through the double belt 28 with the same speed. The speed may be of 3.0 meter per min to 6.0 meter per min. With respect to the illustration of FIG. 1, the conveying direction of the upper metal sheet 16 and the lower metal sheet 18 are fed through the double belt 28 is from the right to the left.

By means of the adhesive dispenser 24, an adhesive is applied to the lower metal sheet 18. More particularly, the adhesive is applied to an inner surface 78 of the lower metal sheet 18. The adhesive may be a one- or two-component adhesive. The adhesive may be an isocyanate-based or isocyanate-polyol reaction adhesive. Preferably, the adhesive may comprise at least a polyol component and an isocyanate component.

For example, the adhesive may be composed as follows:

| | |
|---|---|
| 32 parts | polyetherol, containing sucrose, glycerine and propylene oxide, functionality 5, hydroxyl number 450 mg KOH/g |
| 29.8 parts | polyetherol, containing glycerine and propylene oxide, functionality 3, hydroxyl number 400 mg KOH/g |
| 15.0 parts | flame retardant Tris(1-chloro-2-propyl) phosphate (TCPP) |
| 10.0 parts | di-propylene-glycol, functionality 2, hydroxyl number 837 mg KOH/g |
| 11.3 parts | polyetherol, containing glycerine and propylene oxide, functionality 3, hydroxyl number 230 mg KOH/g |
| 0.9 parts | silicone surfactant |
| 0.7 parts | amine catalyst |
| 0.3 parts | green pigment. |

An amount of the adhesive applied to the inner surface 78 of the lower metal sheet 18 may be 200 g/m$^2$ to 300 g/m$^2$, preferably 220 g/m$^2$ to 280 g/m$^2$ and most preferably 230 g/m$^2$ to 270 g/m$^2$, for example 250 g/m$^2$. The adhesive is applied over a complete width of the lower metal sheet 18. The upper metal sheet 16 and the lower metal sheet 18, which has the adhesive applied thereon, are further conveyed towards the rotating brush 30. The rotating brush 30 is driven by means of the pneumatic motor 40. A rotation speed of the rotating brush 30 is 60 rpm to 90 rpm, preferably 65 rpm to 85 rpm and most preferably 70 rpm to 80 rpm, for example 75 rpm. A portion of the adhesive applied to the lower metal sheet 18 is applied to the upper metal sheet 16 by means of the rotating brush 30 which takes up a portion of the adhesive applied to the lower metal sheet 18 and strips it off onto the upper metal sheet 16. More particularly, the portion of the adhesive applied to the lower metal sheet 18 is applied to an inner surface 80 of the upper metal sheet 16 by means of the rotating brush 30. Preferably, 40% to 60% of the adhesive applied to the lower metal sheet 18 is applied to the upper metal 16 sheet by means of the rotating brush 30, for example 50%.

In this respect, it is to be noted that the reactivity of the adhesive is crucial for the function of the rotating brush 30 as it needs to have slow reactivity and may not cure until the upper metal sheet 16 and the lower metal sheet 18 are inside the double-belt 28. The term "slow" here refers to a gelling time of the adhesive which may be any gelling time longer than 120 seconds at 20° C. Preferably, the gelling time of the adhesive is 164 seconds at 20° C. The adhesive mixture has to remain "liquid" and comprise a low viscosity for a longer time than usual to allow for the rotating brush 30 to take up the adhesive mixture from the lower metal sheet 18 and to apply it to the upper metal sheet 16, which can only be done effectively and adhesive distributed to the upper metal sheet 16 if the adhesive remains in a liquid state. In the present embodiment, the adhesive is applied to the lower metal sheet 18 at a temperature of 30° C. to 40° C., preferably 32° C. to 38° C. and most preferably 33° C. to 37° C., for example 35° C. The viscosity is low enough due to the polyol component and the isocyanate component of the adhesive. For example, the adhesive comprises a viscosity of 0.5 Pa*s at a temperature of 35° C.

The upper metal sheet 16 and the lower metal sheet 18 having the adhesive applied thereon are then fed into the double belt 28, wherein a PIR/PUIR/PUR core material is applied between the upper metal sheet 16 and the lower metal sheet 18 by means of the core material dispenser 26. The PIR/PUIR/PUR core material reacts so as to form the foam core 14 and comes into contact with the adhesive applied to the upper metal sheet 16 and the lower metal sheet 18. Further, the adhesive cures and the foam core 14 is adhered to the upper metal sheet 16 and the lower metal sheet 18. The upper metal sheet 16 and the lower metal sheet 18 having the foam core 14 sandwiched therebetween is cut such that a foam cored sandwich panel 12 is formed with metal sheets 16, 18 as facings at top and bottom.

The invention claimed is:

1. A method for the continuous production of a PIR/PUIR/PUR foam cored sandwich panel with an upper metal sheet and a lower metal sheet, the method comprising:
continuously feeding the upper metal sheet and the lower metal sheet (18) into a double belt,
inserting a PIR/PUIR/PUR core material between the upper metal sheet and the lower metal sheet, and
applying an adhesive to the lower metal sheet,
wherein a portion of the adhesive applied to the lower metal sheet is applied to the upper metal sheet via a rotating brush.

2. The method according to claim 1, wherein the rotating brush extends in a direction parallel to a width of the upper metal sheet and the lower metal sheet.

3. The method according to claim 1, wherein the adhesive is applied to an inner surface of the lower metal sheet and a portion of the adhesive applied to the lower metal sheet is applied to an inner surface of the upper metal sheet via the rotating brush.

4. The method according to claim 3, wherein an amount of the adhesive applied to the inner surface of lower metal sheet is 200 $g/m^2$ to 300 $g/m^2$.

5. The method according to claim 1, wherein the adhesive is applied over a complete width of the lower metal sheet.

6. The method according to claim 1, wherein 40% to 60% of the adhesive applied to the lower metal sheet is applied to the upper metal sheet via the rotating brush.

7. The method according to claim 1, wherein a rotation speed of the rotating brush is 60 rpm to 90 rpm.

8. The method according to claim 1, wherein the rotating brush comprises a plurality of blades, wherein each of the plurality of blades comprises a plurality of bristles.

9. The method according to claim 8, wherein the plurality of blades are arranged in rows spaced apart in a circumferential direction around the rotating brush, wherein the rows extend parallel to a rotational axis of the rotating brush.

* * * * *